Dec. 12, 1939.  J. MEERSTEINER  2,183,243
METAL FASTENER
Filed June 23, 1937
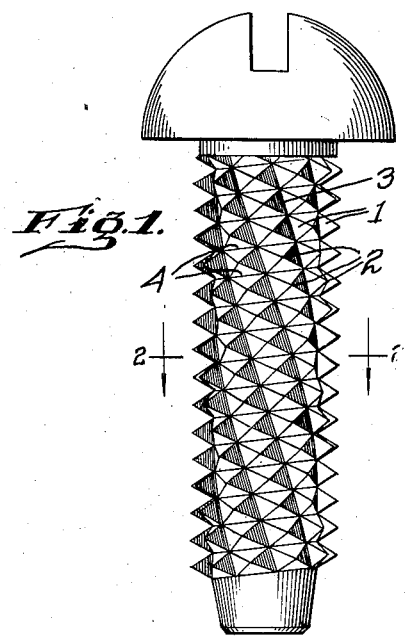
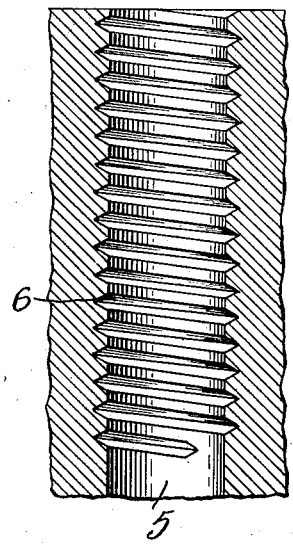
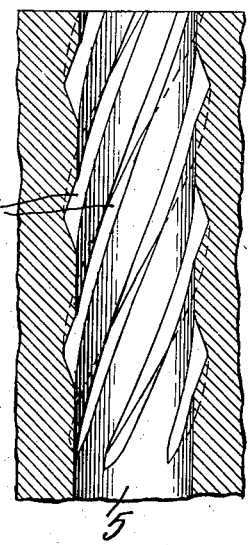
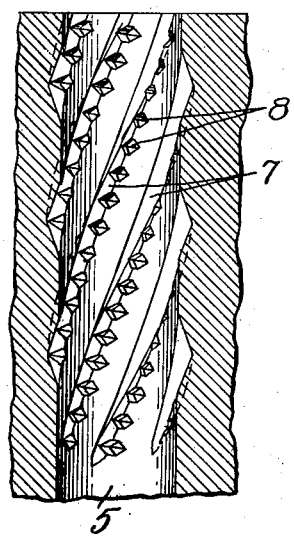
INVENTOR
Johann Meersteiner
BY
Jeffery, Kimball & Eggleston
ATTORNEYS Patented Dec. 12, 1939

2,183,243

UNITED STATES PATENT OFFICE 2,183,243

METAL FASTENER

Johann Meersteiner, Saaz, Czechoslovakia, assignor of one-half to the firm Bechert & Co., Drahtstifte-, Schrauben- und Stahlindustrie-Aktiengesellschaft, S a a z, Czechoslovakia; Frieda Meersteiner administratrix of said Johann Meersteiner, deceased Application June 23, 1937, Serial No. 149,845
In Germany June 27, 1936

9 Claims. (Cl. 85—44)

The invention is a metal fastener of the type designed to secure metal plates, or etc., to a metal base member having an unthreaded bore whose wall is cut and notched or grooved by the fastener while it is being applied. Turn-in screws of this type are known, as are also drive pins (impact or pressure-driven) usually hammer-driven, and permanently locked in the hole by the blocking action of the metal caused to flow into withdrawal-obstructing position as the pin is driven in. The fastener bolt of this application combines in the same structure the advantages both of drive-in pins and of turn-in screws.

This structure will now be described in connection with the illustrative exemplification of the invention shown in the drawing, in which:

Figure 1 is an elevation;

Figure 2 is a horizontal section on the line 2—2, Fig. 1;

Figure 3 is a vertical section showing the bore in the metal base member after the bolt has been turned in by rotation in the ordinary way.

Figure 4 is a corresponding view showing the wall of the bore after the bolt has been driven in, and Figure 5 is the same as Figure 4 except that it shows the wall of the bore after the bolt previously driven in has been given a slight turn for locking purposes.

The bolt is insertible into the bore by rotary, or alternatively, by axial force applied to its head. The shank of the bolt is formed with self-cutting teeth arranged in series in turn-in and drive-in patterns, alternatively operative, all the teeth being members of both patterns. The teeth constituting the turn-in pattern are arranged in series on a helical line, or on helical lines, around the shank and the teeth in the drive-in pattern are arranged in series extending steeply in a generally axial direction, whether on straight lines or on thread lines of high pitch as shown. These teeth I are preferably pyramids, as shown in the drawing, pyramidal or pyramoidal, i. e., of the general nature or order of pyramids, having a relatively sharp point or apex 2 and their bases being bounded and thus determined by intersecting grooves 3 extending steeply lengthwise of the shank, and 4 extending crosswise thereof on helical lines. The points or peaks of these pyramidal elements are metal-cutting, and their predetermined arrangement is characterized by the fact that, in either direction of motion by which the fastener is inserted, whether by rotation or axial drive, a succeeding tooth is located in position to enter and follow the groove made by the preceding tooth instead of making an independent separate groove of its own. The teeth are near enough to act in that way.

The thread or groove cutting part of the teeth, in the bolt illustrated, their points or apexes, may be extended a little in the direction of either or both of the lines referred to, or in a direction more or less approximating one of said lines; i. e., the steep generally axial lines or the helical line, so that they cease to be actual points while remaining thread or groove cutting means along one or the other of the lines referred to according to whether the bolt is being turned in or driven in. The order of narrowness of these cutting parts is indicated generally by the fact that remaining-thread fractions between successive longitudinal lengthwise grooves of a width approximating from 1 to 1½ millimeters have been found to serve effectively. They must of course not be wide enough to preclude driving the bolt. A large number of grooves facilitates production by rolling, as well as hammer-driving.

The illustrated bolt is seen to be closely studded with teeth throughout substantially the entire surface of the shank, and this produces a particularly efficient drive-in and turn-in bolt having a multiplicity of cutting points or edges. It is possible, however, to leave free space on the shank where teeth are absent, for example, a helical band of that character may wind around the shank beside the toothed helix. It will be evident also that the height of the projecting teeth may be increased or decreased, and that the tooth form and dimensions may be varied within the requirements imposed by its function. Where the teeth are of pyramid form, the apex of each pyramid may be located directly over the center of its base or may be displaced to one side successively and uniformly, thus altering the position, area and angles of some or all of the sides as well as the position of the points or tips.

The head of the bolt may be slotted as indicated, or shaped for the application of a wrench. Its end may be truncated as shown, or it may terminate in a sharp point.

The bolt, which may be made of an alloy of relatively low carbon content, can be produced by the rolling process set forth in my co-pending United States application Serial No. 127,266, filed February 23, 1937, which subjects it to more than usual rolling compression and which gives the teeth exactness and sharpness of outline. This makes the teeth hard but they are further hardened by subjecting the bolt, or its toothed portion, to cementing, or to other suitable hardening process. The fastener bolt is intended for use in soft iron and soft steel, and is capable of threading and grooving the same.

Figs. 3, 4 and 5, as indicated in the brief descriptions of those figures, illustrate ways in which the fastener bolt may be used. Fig. 3 shows the effect on the smooth wall of the bore 5 in the metal base member of turning in the screw by application of rotary force, the thread groove 6 being cut by the teeth of the bolt-surrounding helix. Fig. 4 shows the wall of the bore after the bolt has been driven in by the application to its head of axially applied force with consequent cutting of the longitudinal grooves 7 by the teeth in the steep tooth series, and Fig. 5 shows the condition of the bore after the bolt has been hammer-driven or pressure-driven into it, and then given a slight turn with a screw driver to remove the cutting portions of the teeth from registry with the grooves 7, cut by them when the bolt was driven in, and move them into line with ungrooved parts of the wall, such turning not being far enough to bring them into registry with the next succeeding such groove. The cross grooves 8 thus formed lock the bolt against direct withdrawal and hold it more firmly against loosening by vibration. It may however be turned back into registry and removed, by the application of some force.

I claim:

1. A metal fastener that is inserted by turning it in, or alternatively, by driving it in, to a previously unthreaded bore in a block of metal and having separate metal-cutting co-ordinated teeth defined by enclosing grooves and arranged on the shank in alternatively operating respectively drive-in, and turn-in, patterns, each such tooth being a member of two such patterns.

2. A metal fastener that is inserted by turning it in, or alternatively, by driving it in, to a previously unthreaded bore in metal and having self-cutting co-ordinated teeth arranged on the shank in alternatively operating patterns, one of said patterns constituting a regular helical thread of low pitch surrounding the shank, said teeth being separated from each other transversely by grooves extending generally lengthwise of the shank.

3. A metal fastening device that is inserted by turning it in, or alternatively, by driving it in, to a previously unthreaded hole and having a shank with separate teeth formed on it in a predetermined arrangement, such arrangement being characterized by the fact that in either direction of motion, whether in turning or in generally axial advance, a succeeding tooth is located to one side of but in position to enter and follow the groove made by a preceding tooth.

4. A metal fastener having a head, and a shank with metal-cutting teeth formed thereon on a helical line of low pitch and located near enough together to successively enter into the same groove on being turned into a previously unthreaded bore, said teeth being located also in series of teeth extending steeply along the shank in generally axial lines, the teeth of each such series being out of exact axial alignment and close enough together in the case of the teeth of each series to successively enter the adjacent generally longitudinal groove produced in the face of the bore by the driving of the metal fastener into said bore.

5. A metal fastener having metal-cutting teeth formed on its shank and arranged in steep high pitch helical drive-in series extending generally axially of the shank and in turn-in series extending in a direction generally transverse of the shank on a helical line winding about the shank, each tooth having its metal-cutting means effective alternatively on drive-in and turn-in lines, the metal fastener being insertable by driving it in or by turning it in.

6. A metal fastener having its shank provided with peaked or pointed tooth elements of a generally pyramidal or pyramoidal nature defined by intersecting bounding grooves extending respectively axially or on steep helical lines lengthwise of the shank, and helically crosswise of it, said fastener being insertable, alternatively, by driving it in or by turning it in.

7. A metal fastener having the surface of its shank resolved into teeth bounded by tooth-separating grooves and positioned on screw thread lines running, respectively, steeply lengthwise of the shank, and crosswise of the shank according to the pitch of ordinary screw threads, said teeth being thread-cutting in the respective directions of said thread lines to tap on continued rotation a corresponding female thread in the wall of a previously unthreaded bore, and alternatively, on being axially driven to tap steep thread grooves in said wall.

8. A metal fastener having its shank provided with pyramidal elevations defined by bounding grooves, self-cutting in generally longitudinal and generally transverse directions and arranged in thread-tapping helical series, one of low pitch surrounding the shank and others of high pitch running generally lengthwise of it, the series of the two types named being alternatively operative, respectively, on the fastener being turned in and on the fastener being driven in, the fastener thus constituting a combined drive pin and turn-in screw, the points of the pyramidal elevations being shifted against their respective bases an equal extent from the central position.

9. A metal fastener bolt for self-cutting action in the face of a bore in metal and having a head and a thread formed on and surrounding its shank and of too low a pitch to admit of its producing a corresponding thread by self-cutting action, on the metal fastener being hammer driven, the said shank-surrounding thread being crossed by spaced grooves extending generally lengthwise of the shank and being sufficient in number to divide the thread into teeth having alternative cutting edges and of an order of narrowness along the line of the thread of low pitch admitting of the bolt being hammer-driven into the metal bore, the teeth between the grooves by their cutting action in the direction of the length of the shank-surrounding thread admitting of turning of the fastener both before and after it has been hammer driven.

JOHANN MEERSTEINER.